United States Patent
Rhee et al.

(10) Patent No.: US 9,653,188 B2
(45) Date of Patent: May 16, 2017

(54) FABRICATION METHOD OF BURNABLE ABSORBER NUCLEAR FUEL PELLETS AND BURNABLE ABSORBER NUCLEAR FUEL PELLETS FABRICATED BY THE SAME

(71) Applicant: Korea Atomic Energy Research Institute, Daejeon (KR)

(72) Inventors: Young Woo Rhee, Daejeon (KR); Dong-Joo Kim, Daejeon (KR); Jong-Hun Kim, Daejeon (KR); Jae-Jo Yang, Sejong (KR); Keon-Sik Kim, Daejeon (KR); Yang-Hyun Koo, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 901 days.

(21) Appl. No.: 13/747,685

(22) Filed: Jan. 23, 2013

(65) Prior Publication Data

US 2013/0223582 A1  Aug. 29, 2013

(30) Foreign Application Priority Data

Feb. 28, 2012  (KR) .................. 10-2012-0020277

(51) Int. Cl.
*G21C 3/20* (2006.01)
*G21C 3/326* (2006.01)
(Continued)

(52) U.S. Cl.
CPC .............. *G21C 3/20* (2013.01); *G21C 3/326* (2013.01); *G21C 3/623* (2013.01); *G21C 21/02* (2013.01); *Y02E 30/38* (2013.01)

(58) Field of Classification Search
CPC .................................. G21C 21/02; C23C 2/00
(Continued)

(56) References Cited

U.S. PATENT DOCUMENTS 4,460,522 A * 7/1984 Kinugasa ............... G21C 3/623
                                                    252/637
4,774,051 A * 9/1988 Peehs ....................... G21C 3/18
                                                    252/637
(Continued)

FOREIGN PATENT DOCUMENTS

KR  100558323 A  11/2005
KR  100855108 B1  8/2008

OTHER PUBLICATIONS

Yoon, Y.S. et al., "Sintering Characteristics of UO2 with Addition of SiB4 as Burnable Poison," Journal of the Korean Ceramic Society, vol. 28, No. 10, 1991, pp. 767-776.
(Continued)

*Primary Examiner* — Jack W Keith
*Assistant Examiner* — Lily C Garner
(74) *Attorney, Agent, or Firm* — Fredrikson & Byron, P.A.

(57) ABSTRACT

A fabrication method of burnable absorber nuclear fuel pellets and burnable absorber nuclear fuel pellets fabricated by the same are provided, in which the fabrication method includes adding boron compound and manganese compound to one or more type of nuclear fuel powders selected from the group consisting of uranium dioxide ($UO_2$), plutonium dioxide ($PuO_2$) and thorium dioxide ($ThO_2$) and mixing the same (step 1), compacting the mixed powder of step 1 into compacts (step 2), and sintering the compacts of step 2 under hydrogen atmosphere (step 3). According to the fabrication method, sintering can be performed under hydrogen atmosphere at a temperature lower than the hydrogen atmosphere sintering that is conventionally applied in the nuclear fuel sintered pellet mass production, by adding sintering additives such as manganese oxide or the like.

7 Claims, 3 Drawing Sheets

(51) Int. Cl.
*G21C 3/62* (2006.01)
*G21C 21/02* (2006.01)

(58) Field of Classification Search
USPC ........ 376/419; 505/445; 264/0.5; 252/637–8
See application file for complete search history.

(56) References Cited

U.S. PATENT DOCUMENTS

| | | | |
|---|---|---|---|
| 5,075,075 A | | 12/1991 | Kapil |
| 5,147,598 A | | 9/1992 | Kapil |
| 5,978,431 A | * | 11/1999 | Edwards .................. G21C 3/62 252/638 |
| 7,139,360 B2 | | 11/2006 | Lahoda |
| 2005/0261136 A1 | * | 11/2005 | Rhee ...................... G21C 21/02 505/445 |
| 2009/0143215 A1 | | 6/2009 | Sweeney et al. |

OTHER PUBLICATIONS

Renier, J.-P.A. et al., "Development of Improved Burnable Poisons for Commercial Nuclear Power Reactors," NERI Project No. 99-0074, 2001, (760 pgs.).
Sanders, C.E. et al., "Study of the Effect of Integral Absorbers for PWR Burnup Credit," Oak Ridge National Laboratory, U.S. Nuclear Regulatory Commission, 2002, (84 pgs.).
ZUROMSKy, G. et al., "Burnable Poison Additions to UO2," Joint United States Atomic Energy Commission Research and Development Program, 1968, (35 pgs.).
Rhee, Y.W. et al., "Densification kinetics of MnO-doped UO2-10wt%Gd2O3 compact," Thermochimica Acta 455, 2007, pp. 80-85.

* cited by examiner

FABRICATION METHOD OF BURNABLE ABSORBER NUCLEAR FUEL PELLETS AND BURNABLE ABSORBER NUCLEAR FUEL PELLETS FABRICATED BY THE SAME

CROSS-REFERENCE TO RELATED APPLICATIONS

This application claims priority from Korean Patent Application No. 10-2012-0020277, filed on Feb. 28, 2012, in the Korean Intellectual Property Office, the disclosure of which is incorporated herein by reference in its entirety.

BACKGROUND OF THE INVENTION

1. Field of the Invention

The present invention relates to a fabrication method of burnable absorber nuclear fuel pellets and burnable absorber nuclear fuel pellets fabricated by the same.

2. Description of the Related Art

Uranium dioxide (UO2) sintered pellets are most widely used nuclear fuels, which contains 1 to 5 wt. % of $U^{235}$. As $U^{235}$ disintegrates due to neutrons, nuclear fissile energy is generated. It is economically more beneficial, if the operation cycle of the nuclear reactor core is prolonged, thus increasing the operability thereof. It is thus beneficial to load nuclear fissionable material in the reactor core as much as possible to increase the operation cycle of the nuclear reactor core. However, too much nuclear fissionable material will cause too high reactivity in the initial stage of the cycle, thus affecting safety of the nuclear reactor core. Accordingly, for the purpose of regulating neutrons, burnable absorber sintered pellets containing burnable absorber material with high absorption cross-section such as gadolinium (Gd) or erbium (Er) can be utilized. These rods of burnable absorber sintered pellets are sometimes called "poison rods" due to poisonous property thereof.

Attempt has been made in 1960 by Combustion Engineering Inc. (USA) to fabricate burnable absorber sintered pellets (or "poison rods") by uniformly adding boron (B) compounds including $B_4C$ as burnable absorber materials. However, there were drawbacks such as formation of $B_2O_3$ with low melting point and low boiling point by the reaction between excess oxygen of $UO_2$ powder with boron during sintering, which easily volatilizes, and increased internal pressure due to generation of helium during the reaction of $^{10}B+^1n\rightarrow^{11}B$(excited state)$\rightarrow^4He+^7Li$.

Meanwhile, the researchers of Irradiation Engineering Inc. observed oxidation behavior of $UO_2$—$B_4C$ blend at a temperature range of 325° C.-1600° C. The observation confirmed that the oxidation reaction with the excess oxygen within $UO_2$ of $B_4C$ occurs across the entire range of the test temperature, and that formed $B_2O_3$ rarely volatilized under 1200° C. It was also reported that the remaining boron compounds after volatilization formed $UB_4$ phase at a temperature between 1250° C. and 1300° C., which were thus present in $UO_2$. However, to address the relatively high volatility during sintering, it was necessary to add excess amount of excess boron compounds in an initial stage in consideration of the volatilization amount to ensure that the boron remains in the sintered pellets in the amount that is sufficient to act as the burnable absorber pellets. However, the excessive amount of volatilized boron caused shortcoming of severe degradation of density of sintered pellets. Accordingly, the sintered density did not exceed 90% TD (theoretical density) even when the sintering was done at the temperature of 1600° C.

The Kraftwerk Union Aktiengesellschaft (Germany, U.S. Pat. No. 4,774,051) later reported production of sintered compacts with uniformly dispersed boron therein, by mixing 2-100 μm $UB_x$ (X=2, 4, 12) and $B_4C$ powder with 15 μm $UO_2$ powder, respectively, and sintering the respective mixtures under reducing and slightly oxidizing atmospheres. Although the research reports that the sintered compacts with sintered density exceeding 95% TD were produced by synthesizing $UB_x$ (X=2, 4, 12) powder with $UO_2$ powder in advance, and then sintering the same at 1700° C., the temperature similar to the conventionally applied temperature of producing sintered compacts by utilizing reducing atmosphere such as hydrogen gas, there was a difficulty in implementing the process in the conventional sintered pellet producing process because it was necessary to synthesize $UB_x$ powder in advance.

It was also reported that sintered compacts with homogenously-dispersed boron at a sintered density of 95% TD (theoretical density) can be fabricated when sintering is performed at low temperature of 1150° C. under slightly oxidizing atmosphere using $CO_2$ gas, and this is considered to be attributable to the following two typical phenomena that occur when $UO_2$ is sintered under slightly oxidizing atmosphere.

Certain slightly oxidizing atmosphere sintering provides the effect of capturing $B_4C$ within grains due to fast grain boundary migration (abnormal grain growth) in AUC-$UO_2$. Further, because of higher oxygen partial pressure of $CO_2$ gas atmosphere than reducing gas atmosphere, the oxygen/metal (O/U) ratio of $UO_2$ increases, and as U diffusion coefficient increases, it is possible to densify $UO_2$ compacts even at temperature as low as 1150° C. which does not have sufficient volatilization of $B_2O_3$. Accordingly, it is possible to reduce open porosity and boron volatilization can be effectively suppressed because passages for leaking of volatilized $B_2O_3$ out of the sintered compacts are removed.

However, because the above phenomena are only observed in $UO_2$ powder made by AUC (wet) process, it is hardly implementable to the other $UO_2$ powders, such as DC-, IDR-, ADU-route $UO_2$ powders. Further, in terms of fabrication, because $CO_2$ gas is used as the sintering atmosphere, the method is hardly compatible with the conventional nuclear fuel sintered compact fabricating process which utilizes reducing atmosphere sintering, and the capturing of $CO_2$ gas with low diffusivity within the porosity of the sintered pellets causes much more swelling of nuclear fuel to aggravate during the irradiation in nuclear reactor. The gases such as CO and $CO_2$ do not normally escape from closed pores in the sintered $UO_2$ pellet because of lower solubility than that of H2 and O2.

Due to the problems mentioned above, it has been never reported that the burnable absorber sintered pellets with uniformly-dispersed boron therein are used in the commercial light-water reactor. That is, the currently-available light-water reactor uses sintered pellets in the form in which boron is coated to surfaces thereof. Studies have been conducted to fabricate integrated burnable poison sintered pellets by uniformly adding $SiB_4$ to $UO_2$, but no attempt of commercialization has been made so far.

SUMMARY OF THE INVENTION

In order to achieve the objects mentioned above, a technical objective is to provide a fabrication method of burnable absorber nuclear fuel pellets which may include adding boron compound and manganese compound to one or more type of nuclear fuel powders selected from the group consisting of uranium dioxide ($UO_2$), plutonium dioxide ($PuO_2$) and thorium dioxide ($ThO_2$) and mixing the same (step 1), compacting the mixed powder of step 1 into compacts (step 2), and sintering the compacts of step 2 under hydrogen atmosphere (step 3).

Further, another technical object is to provide burnable absorber nuclear fuel pellets fabricated by said fabrication method.

According to the fabrication method, sintering can be performed under hydrogen atmosphere at a temperature lower than the hydrogen atmosphere sintering that is conventionally applied in the nuclear fuel sintered pellet mass production, by adding sintering additives such as manganese oxide or the like. As a result, sufficient $UO_2$ densification occurs at a temperature at which boron volatilization is not apparent, thereby decreasing the open porosity, and removing exit passages for the volatilizing boron and minimizing boron volatilization. Further, because mass-produced boron compounds such as boron carbide ($B_4C$), titanium diboride ($TiB_2$), zirconium diboride ($ZrB_2$), or boron nitride (BN) are applicable, additional process to synthesize $UB_x$ is not necessary. Furthermore, while the problem of swelling during irradiation is experienced in the sintered pellets fabricated by the conventional method that utilizes $CO_2$ gas, the burnable absorber nuclear fuel sintered pellets according to the present invention prevent swelling due to carbon dioxide and have sintered density as high as 90% TD or above.

BRIEF DESCRIPTION OF THE DRAWINGS

The foregoing and/or other aspects of the present invention will be more apparent upon reading the description of certain exemplary embodiments with reference to the accompanying drawings, in which.

DETAILED DESCRIPTION OF THE INVENTION

Figure 1:
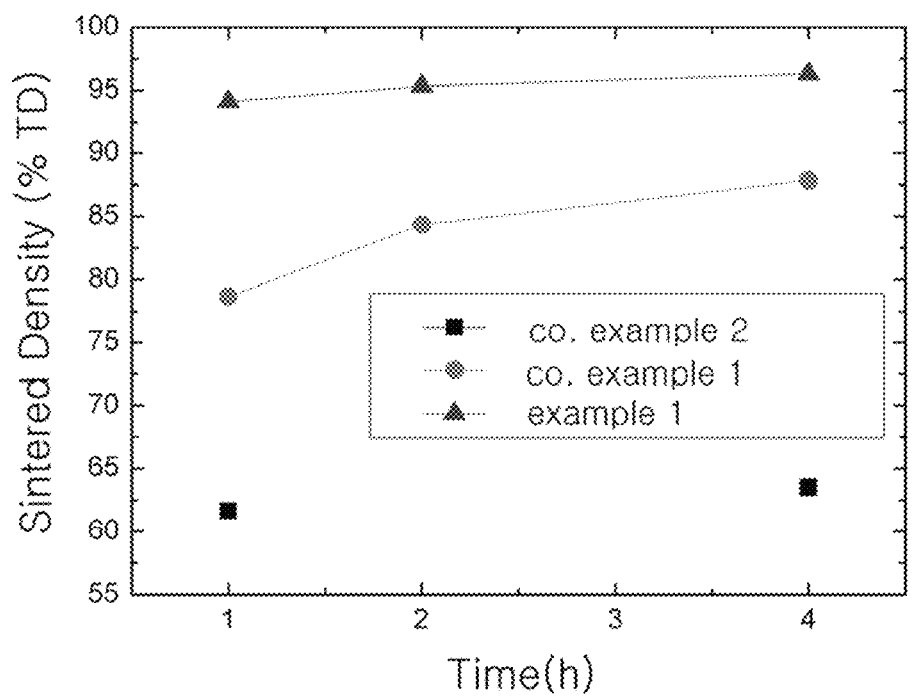
FIG. 1 is a graphical representation of variations of sintered density of $UO_2$ nuclear fuel sintered pellets and burnable absorber nuclear fuel sintered pellets over sintering time.

Hereinbelow, a fabrication method of burnable absorber nuclear fuel pellets according to an embodiment of the present invention will be explained with reference to the respective steps.

A fabrication method of burnable absorber nuclear fuel pellets according to an embodiment includes step 1 of adding boron compounds and manganese compounds to one or more types of nuclear fuel powder selected from the group consisting of uranium dioxide ($UO_2$), plutonium dioxide ($PuO_2$) and thorium dioxide ($ThO_2$) and mixing the same.

Currently, gadolinium (Gd) is the most-widely used burnable neutron absorber in the fabrication of burnable absorber nuclear fuel pellets. However, being one of rare earth metals, price of gadolinium has soared and this price increase is expected to continue considering use of gadolinium in a variety of industries. As the shortage of gadolinium supply is quite obvious, a method is necessary, with which it is possible to fabricate burnable absorber nuclear fuel pellets with replacement of gadolinium. There is an example where boron compounds such as $B_4C$, BN are added to uranium dioxide powder to form burnable absorber nuclear fuel pellets, but the produced pellets have shortcomings of low sintered density and swelling due to $CO_2$ gas.

In awareness of the above shortcomings, step 1 according to an embodiment produces raw material powder by adding a boron compound and a manganese compound and mixing the same.

During sintering, the boron compound would react with excess oxygen within $UO_2$, water or the like to thus form $B_2O_3$. It is reported that typical high temperature sintering in the range of 1600° C.-1800° C. under hydrogen atmosphere causes subsequently accelerate boron volatilization. As a result, the $UO_2$ sintered compacts added with boron compound has significantly low sintered density than that of $UO_2$ sintered pellets which are sintered at the same condition without boron addition. The low temperature sintering under slightly oxidizing atmosphere such as $CO_2$ atmosphere causes a problem such as no compatibility with the existing mass production system.

Accordingly, a fabrication method of burnable absorber nuclear fuel sintered pellets according to an embodiment proposes to densify $UO_2$ (to which boron compound is added) at a low temperature where $B_2O_3$ volatilization is not so noticeable, while using hydrogen atmosphere sintering, which is used in the conventional general sintered pellet mass production process, to thus promote sintering of $UO_2$ to which boron compound is added, than the sintering of pure $UO_2$. That is, by considering the fact that $B_2O_3$ is in liquid phase, liquid phase sintering is performed, thereby providing passages that allow faster material migration and also provides $UO_2$ densification.

Accordingly, the boron compound at step 1 may use boron carbide ($B_4C$), titanium diboride ($TiB_2$), zirconium diboride ($ZrB_2$), or boron nitride (BN) that can form $B_2O_3$ by reacting with excess oxygen, water, or the like within $UO_2$, and may preferably use boron nitride, but not limited thereto. Accordingly, any boron compound may be used provided that the boron compound can form $B_2O_3$ by reacting with excess oxygen of $UO_2$ during sintering.

Meanwhile, considering the relatively very low temperature of sintering than that applied in the conventional art, a fabrication method of burnable absorber nuclear fuel sintered pellets according to an embodiment may not be able to achieve sufficient sintered density exceeding 90% TD only with the effect of liquid sintering of boron compound. That is, a sintering additive to further accelerate the densification at low temperature under hydrogen atmosphere is necessary. Accordingly, step 1 according to an embodiment additionally adds manganese compound as a sintering additive, according to which sintering is further promoted under reducing atmosphere including hydrogen atmosphere. Further, combined with the liquid phase sintering effect of boron compound, it is possible to fabricate $UO_2$ nuclear fuel sintered pellets with boron compound uniformly dispersed therein, at a sintered density as high as 90% TD or above even at a lower sintering temperature than the conventional art.

The manganese compound is employed in the form of manganese ion into $UO_2$ lattices during sintering, to thus cause defect such as U vacancy to generate in the $UO_2$ grain structure and subsequently increase rate of diffusion and material migration. Fast migration of materials due to the presence of manganese can promote densification and sintering of $UO_2$ nuclear fuel compacts.

At step 1, uranium dioxide ($UO_2$), plutonium dioxide ($PuO_2$), and thorium dioxide ($ThO_2$), which are applicable as the nuclear fuel powder, are nuclear fuel materials with identical lattice structures, and may be used in appropriate mixture or singly.

At step 1, the manganese compound may use manganese oxide (MnO), manganese dioxide ($MnO_2$), manganese sulfide, manganese fluoride, or manganese chloride, and more preferably use manganese oxide, but not limited thereto. Accordingly, any manganese compound may be used, provided that the compound can supply manganese ions that are employed into $UO_2$ lattice during sintering.

At step 1, the boron compound such as boron carbide ($B_4C$), titanium diboride ($TiB_2$), zirconium diboride ($ZrB_2$), or boron nitride (BN) may preferably added in an amount of 0.01 to 5 wt. % per nuclear fuel powder. If the boron compound is added in an amount less than 0.01 wt. % per nuclear fuel powder, neutron absorbing ability by boron is hardly obtainable, and if the boron compound is added in an amount greater than 5 wt. % per nuclear fuel powder, excess amount of boron compound can cause rise of internal pressure of the rod due to swelling and He gas formation during irradiation of the sintered pellets.

At step 1, the manganese compound such as manganese oxide (MnO), manganese dioxide ($MnO_2$), manganese sulfide, manganese fluoride, or manganese chloride may preferably be added to the nuclear fuel powder in an amount of 0.01 to 1 wt. %. If manganese compound is added in an amount less than 0.01 wt. % per nuclear fuel powder, the effect of sintering acceleration by the manganese compound is not obtained, while if manganese compound is added in an amount exceeding 1 wt. % per nuclear fuel powder, oversintering may occur, thus deteriorating sintered density of the sintered pellets.

The mixing at step 1 may be conducted by an adequate apparatus such as tabular mixer, V-mixer, attrition mill, or ball mill, and any appropriate apparatus may be used, provided that the apparatus can fabricate uniformly-mixed powder.

In one embodiment, a fabrication method of burnable absorber nuclear fuel sintered pellets may include step 2 of compacting the mixed powder of step 1 into compacts, through which compacts having uniformly-dispersed boron compound and manganese compound therein are produced.

The compacting may be performed under pressure of 1 to 5 ton/cm$^2$. If the pressure for compacting is less than 1 ton/cm$^2$, the mixed powder is not compressed sufficiently, thus failing to provide desired integrity and convenience in handling the compacts. If the compacting pressure exceeds 5 ton/cm$^2$, compression under excessive pressure aggravates wear of the compacting mold, while such compression does not give substantial effect on the final sintered density.

Meanwhile, a conventional compacting such as compression may be implemented, and the compacts may preferably be formed into cylindrical or annular forms after the compacting, but not limited thereto.

In one embodiment, a fabrication method of burnable absorber nuclear fuel sintered pellets may include step 3 of sintering the compacts of step 2 under hydrogen atmosphere, either using pure hydrogen gas or additionally using gases such as argon, nitrogen, carbon dioxide or water vapor to form hydrogen atmosphere.

Accordingly, it is possible to fabricate burnable absorber nuclear fuel sintered pellets by sintering the compacts produced at step 2 under hydrogen atmosphere. A conventional fabrication method of burnable absorber nuclear fuel sintered pellets by adding boron was accompanied by the shortcoming of volatilization of the added boron due to sintering at temperature exceeding approximately 1600° C.

If the sintering temperature is decreased to prevent volatilization of boron, then the density of the sintered pellets deteriorates. Furthermore, attempts have been made to prevent volatilization of boron and density deterioration by synthesizing boron compound with low volatility into $UB_x$ or the like in advance, or performing sintering at low temperature under carbon dioxide atmosphere. However, these attempts have shortcomings. That is, it is necessary to add $UB_x$ synthesis process to the conventional production system, or when carbon dioxide is used as the atmosphere gas, the carbon dioxide can be encapsulated within closed pores of the sintered pellets to cause severe swelling during irradiation of the nuclear fuel. The fabrication method according to an embodiment resolves such problems, while utilizing the existing sintered pellet production system as is, by simply adding a process of adding manganese compound to the nuclear fuel powder to thus accelerate sintering, thereby providing a fabrication process in which sintering is conducted at a relatively low temperature in hydrogen atmosphere, boron volatilization is prevented and high sintered density is obtained. Further, because the size of atoms is smaller than that of carbon dioxide, sintering is performed under hydrogen atmosphere that allows easy escape from the sintered pellets, thereby preventing aggravation of swelling during the irradiation of nuclear fuel.

The sintering at step 3 may be performed at a temperature range of 1000 to 1500° C., or preferably of 1000 to 1200° C., depending on the amounts of the added boron compound and manganese compound. If the amount of boron compound is larger, increasing presence of boron compound remaining after formation of a predetermined amount of $B_2O_3$ would cause increased cross-section to hinder the densification, thereby generating a need to increase sintering temperature, and if the amount of manganese compound is larger, sufficient densification can be achieved even at a lower sintering temperature. The sintering temperature may be set to be lower than the conventionally-applied sintering temperature such as 1600-1800° C., and it is thus possible to prevent the volatilization of boron during sintering due to low sintering temperature. If the sintering is performed at a temperature less than 1000° C., the problem of deteriorated density of the sintered pellets may occur, while if the sintering is performed at a temperature exceeding 1500° C., added boron may volatilize.

If the sintering at step 3 is performed at a temperature of 1000 to 1200° C., a fabrication method in one embodiment may additionally include a step of additionally performing heat treatment at a temperature range of 1200 to 1500° C. to allow the boron compound within the sintered pellets to react in more stable phase (i.e., $UB_x$ (x=2, 4, 12), but not limited thereto.

In one embodiment, burnable absorber nuclear fuel sintered pellets fabricated by the fabrication method according to an embodiment of the present invention are provided.

The burnable absorber nuclear fuel sintered pellets according to an embodiment are fabricated through sintering under hydrogen atmosphere at a lower temperature than conventionally-applied temperature, according to which volatilization of boron is prevented, and boron compounds such as boron carbide ($B_4C$), titanium diboride ($TiB_2$), zirconium diboride ($ZrB_2$), or boron nitride (BN) is uniformly dispersed in the nuclear fuel material such as uranium dioxide, plutonium dioxide or thorium dioxide, and high sintered density is ensured. Further, the sintering under hydrogen atmosphere enables compatibility with the existing sintered pellet production system.

The burnable absorber nuclear fuel pellets according to an embodiment of the present invention may have sintered density of 90% TD or above. That is, the nuclear fuel sintered pellets according to an embodiment can have relatively higher sintered density despite of being sintered under hydrogen atmosphere at low temperature.

An embodiment of the present invention will be explained in greater detail below with reference to Examples. However, the Examples are provided only for illustrative purpose and should not be construed as limiting the invention.

Example 1

Fabrication of Burnable Absorber Nuclear Fuel Pellets 1

Step 1: Mixed powder was prepared by adding boron nitride and manganese oxide to uranium dioxide powder. Boron nitride was added to uranium dioxide powder in an amount of 0.1 wt. %, and manganese oxide was added to uranium dioxide powder in an amount of 0.2 wt. %, and mixed.

Step 2: The mixed powder prepared at Step 1 was subject to compacting under 3 ton/cm$^2$ of pressure into compacts.

Step 3: The compacts prepared at Step 2 were sintered under hydrogen atmosphere at 1100° C. for 1 to 4 hr, to form burnable absorber nuclear fuel pellets.

Comparative Example 1

The burnable absorber nuclear fuel pellets were fabricated by the same process as explained above at Example 1, except for the difference of preparing the mixed powder without adding manganese oxide at Step 1.

Comparative Example 2

The burnable absorber nuclear fuel pellets were fabricated by the same process as explained above at Example 1, except for the difference of preparing UO$_2$ powder without adding manganese oxide and boron nitride at Step 1.

Experimental Example 1

Analysis of Sintered Density of Burnable Absorber Nuclear Fuel Pellets

The sintered density of the burnable absorber nuclear fuel pellets fabricated at Example 1, and Comparative Examples 1 and 2 was analyzed with immersion method and the results are presented in FIG. 1.

Referring to FIG. 1, the nuclear fuel sintered pellets fabricated by adding boron compound only (Comparative Example 1) had far higher sintered density than that of the pure UO$_2$ nuclear fuel sintered pellets fabricated under the same conditions of sintering temperature and sintering time (Comparative Example 2). This indicates that part of boron compound within the sintering temperature range of the present invention forms B$_2$O$_3$ liquid phase and subsequently accelerates the sintering of the nuclear fuel. However, the sintered density stayed around 88% TD and thus was lower than the targeting density (90% TD) even after 4 hours of sintering.

On the contrary, the burnable nuclear fuel sintered pellets fabricated at Example 1 according to the present invention, to which boron compound (i.e., boron nitride) and sintering additive (i.e., manganese oxide) were added, exhibited higher sintered density than the sintered pellets fabricated at Comparative Examples 1 and 2. The sintered density was approximately 94% TD after 1 hour of sintering, which further increased as sintering continued. The increase of sintered density was very minute after approximately 4 hours of sintering.

From the above finding, it was confirmed that the sintered density could be further enhanced by adding boron compound and manganese compound as the sintering additives in the fabrication method of burnable absorber nuclear fuel pellets according to the present invention.

Experimental Example 2

Analysis of Microstructure of Burnable Absorber Nuclear Fuel Pellets

Figure 2:
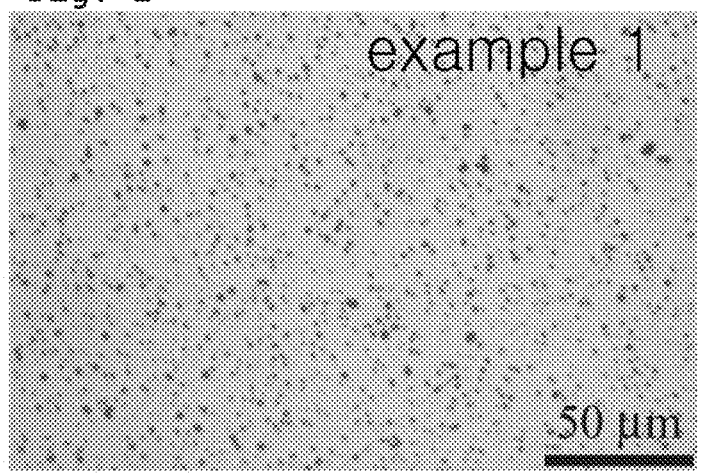
FIGS. 2 and 3 are optical microscopic images of the burnable absorber nuclear fuel sintered pellets.
Figure 3:
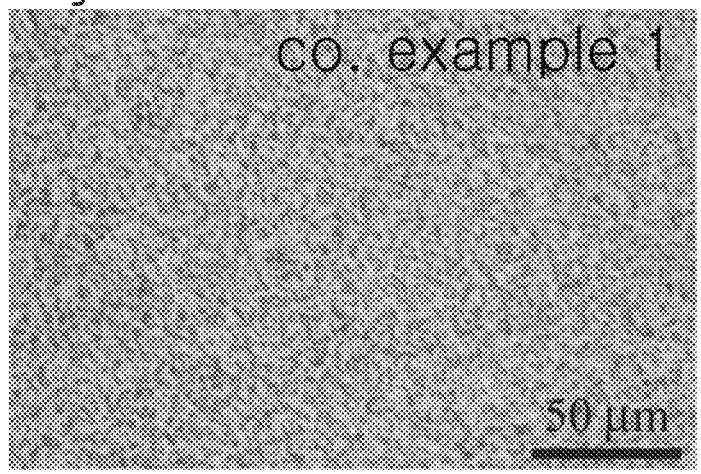

The surfaces of the burnable absorber nuclear fuel pellets of Example 1 and the surfaces of the sintered pellets of Comparative Example 1 were examined under optical microscope and the results are presented in FIGS. 2 and 3.

Referring to FIGS. 2 and 3, the burnable absorber nuclear fuel pellets of Example 1 had a considerably fewer number of porosity (black dots) than the sintered pellets fabricated at Comparative Example 1. This is because the sintered pellets of Comparative Example 1 did not have proper densification due to sintering condition thereof, that is, low temperature sintering without being added with sintering additives. On the contrary, the sintered pellets of Example 1 had high sintered density, because densification was properly processed, generating less number of porosity even at low temperature due to the presence of manganese oxide added thereto.

From the above finding, it was confirmed that the densification of the sintered pellets can be achieved even at a relatively low sintering temperature, by adding the manganese oxide as the sintering additive according to the fabrication method of burnable absorber nuclear fuel pellets according to the present invention. As a result, sintered pellets with high sintered density can be fabricated.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A fabrication method of burnable absorber nuclear fuel pellets, comprising:
    adding a boron compound, which is one or more of compounds selected from the group consisting of boron carbide (B$_4$C), titanium diboride (TiB$_2$), zirconium diboride (ZrB$_2$) and boron nitride (BN) and a manganese compound to one or more of nuclear fuel powders selected from the group consisting of uranium dioxide (UO$_2$), plutonium dioxide (PuO$_2$) and thorium dioxide (ThO$_2$) and mixing the same (step 1);
    compacting the mixed powder of step 1 into compacts (step 2); and
    sintering the compacts of step 2 under a hydrogen atmosphere (step 3) performed at a temperature range of between about 1000° C. and about 1500° C., wherein, upon sintering, the nuclear fuel pellets have a density of 90% TD (theoretical density) or above, wherein the boron compound of step 1 is added in an amount of 0.01 to 5 wt. % per nuclear fuel powder, and the manganese compound of step 1 is added in an amount of 0.01 to 1 wt. % per nuclear fuel powder, and mixed therein, wherein the boron compound and the manganese compound are uniformly dispersed in the compacts of step 2.

2. The fabrication method of claim 1, wherein the boron compound of step 1 is boron nitride (BN).

3. The fabrication method of claim 1, wherein the manganese compound of step 1 is one or more of compounds selected from the group consisting of manganese oxide (MnO), manganese dioxide ($MnO_2$), manganese sulfide, manganese fluoride, and manganese chloride.

4. The fabrication method of claim 1, wherein the manganese compound of step 1 is manganese oxide (MnO).

5. The fabrication method of claim 1, wherein the compacts of step 2 are formed under pressure of 1 to 5 ton/$cm^2$.

6. The fabrication method of claim 1, wherein the sintering of step 3 is performed at a temperature range of 1000 to 1200 degree C.

7. The fabrication method of claim 1, wherein the hydrogen atmosphere further comprises one or more of gases selected from the group consisting of argon, nitrogen, carbon dioxide and water vapor.

\* \* \* \* \*

UNITED STATES PATENT AND TRADEMARK OFFICE
CERTIFICATE OF CORRECTION

PATENT NO. : 9,653,188 B2  Page 1 of 1
APPLICATION NO. : 13/747685
DATED : May 16, 2017
INVENTOR(S) : Young Woo Rhee et al.

It is certified that error appears in the above-identified patent and that said Letters Patent is hereby corrected as shown below:

On the Title Page

Item (72) inventor Jae-Jo Yang's name as listed should read as follows: Jae-Ho Yang Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*